(12) United States Patent
Singh

(10) Patent No.: US 9,195,372 B2
(45) Date of Patent: Nov. 24, 2015

(54) METHODS, SYSTEMS, AND COMPUTER PROGRAM PRODUCTS FOR GROUPING TABBED PORTION OF A DISPLAY OBJECT BASED ON CONTENT RELATIONSHIPS AND USER INTERACTION LEVELS

(75) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 2698 days.

(21) Appl. No.: 11/476,435

(22) Filed: Jun. 28, 2006

(65) Prior Publication Data

US 2008/0005686 A1    Jan. 3, 2008

(51) Int. Cl.
*G06F 3/048*    (2013.01)
*G06F 3/0483*    (2013.01)

(52) U.S. Cl.
CPC ..................... *G06F 3/0483* (2013.01)

(58) Field of Classification Search
CPC .......... G06F 17/3053; G06F 17/30595; G06F 11/30; G06Q 10/0833
USPC ................................. 715/777, 745
See application file for complete search history.

(56) References Cited

U.S. PATENT DOCUMENTS

| | | | |
|---|---|---|---|
| 5,801,702 A | | 9/1998 | Dolan et al. |
| 6,310,630 B1 | | 10/2001 | Kulkarni et al. |
| 2002/0059395 A1 | | 5/2002 | Liou |
| 2004/0093562 A1 | * | 5/2004 | Diorio et al. .................. 715/513 |
| 2006/0041927 A1 | * | 2/2006 | Stark et al. ..................... 725/139 |
| 2006/0106866 A1 | * | 5/2006 | Green et al. ................. 707/104.1 |
| 2006/0198504 A1 | * | 9/2006 | Shemisa et al. ........... 379/201.02 |
| 2007/0117557 A1 | * | 5/2007 | Adjali et al. .................. 455/418 |
| 2007/0162864 A1 | * | 7/2007 | Masselle et al. .............. 715/765 |
| 2007/0288864 A1 | * | 12/2007 | Keereepart et al. ........... 715/790 |

OTHER PUBLICATIONS

"Talk:Firefox:3.0 Tabbed Browsing-Mozilla Wiki;" http://wiki.mozilla.org/Talk:Firefox:3.0_Tabbed_Browsing, pp. 1-8 (Modified Mar. 17, 2006).
"Tabbrowser Extensions," http://piro.sakura.ne.jp/xul/tabextensions/index.html.en#what, p. 1 (Modified Mar. 13, 2006).
Mellor, "Tabs Open Relative," Firefox Add-ons, https://addons.mozilla.org/firefox/1956/, pp. 1-3 (Jan. 26, 2006).
Mattk, "Tab History," Firefox Add-ons, https://addons.mozilla.org/firefox/1859/, pp. 1-3 (Jan. 21, 2006).

(Continued)

*Primary Examiner* — Amy Ng
*Assistant Examiner* — Andres E Gutierrez

(57) ABSTRACT

Methods, systems, and computer program products for grouping tabbed portions of a display object based on content relationships and user interaction levels are disclosed. According to one method, a display object including one or more tabbed portions is provided for display via a computer display device. A level of user interaction associated with each of the tabbed portions is monitored. User input for adding new information to the display object is received. A level of content relationship between the new information and the information including in the at least one of the tabbed portions is determined. A new tabbed portion is created and grouped with the at least one tabbed portion based on the determined level of content relationship and the level of user interaction associated with the at least one tabbed portion.

35 Claims, 7 Drawing Sheets

(56) References Cited

OTHER PUBLICATIONS

"Window Management-A Proposal;" <http://my.opera.com/community/forums/topic.dml?id =58706&t=1133810579&page=1, pp. 1-15 (Copyright 2006).

Sackman, "TabHistory," Firefox Add-ons, https://addons.mozilla.org/firefox/1956/734/, pp. 1-3 (Dec. 13, 2005).

Yuen, "HashColouredTabs," https://addons.mozilla.org/extensions/moreinfo.php?application=firefox&category=Tabbed+Browsing&numpg=10&id=437, pp. 1-2 (Nov. 29, 2005).

Sickle, "Browser Browsing (was Re: Firefox Sucks!)," Google Groups, p. 1 (Nov. 7, 2004).

"Tab Mix Plus," http://tmp.garyr.net/, p. 1 (Publication Date Unknown).

* cited by examiner

METHODS, SYSTEMS, AND COMPUTER PROGRAM PRODUCTS FOR GROUPING TABBED PORTION OF A DISPLAY OBJECT BASED ON CONTENT RELATIONSHIPS AND USER INTERACTION LEVELS

TECHNICAL FIELD

The subject matter described herein relates to controlling display of information via a computer display device. More particularly, the subject matter described herein relates to methods, systems, and computer program products for grouping tabbed portions of a display object based on content relationships and user interaction levels.

BACKGROUND ART

In computer display systems, it is desirable to present information to a user in an organized manner. Most computer operating systems include graphical user interfaces that display information to a user using graphical objects, which will be referred to herein as display objects. One common example of a display object that is used to display information to a user is a window object. A window object includes a frame that encloses the information being displayed to the user. The window object may also include controls for controlling display of information within the window object.

A window object may be divided into tabbed portions or tabs for organizing display of different information. For example, the System Properties window object displayed by the Microsoft Windows XP® operating system contains various folder tabs for managing hardware and software aspects associated with a computer system. Examples of tabs that are available via the System Properties window object include a General tab, a Computer Name tab, a Hardware tab, and an Advanced tab. Each of these tabs displays different information to a user and allows the user to modify computer system properties. However, the Microsoft Windows XP® operating system does not allow a user to add new tabs to existing window objects or to organize or group tabs that are related to each other.

In addition to being used by operating systems to organize the display of information to a user, tabs have also been used by applications, such as web browsers. However, some conventional web browsers lack the ability to simultaneously display multiple web pages using tabs. Web browsers include web clients that allow a user to contact and obtain information from web servers. Web browsers display information received from web servers in window object display areas. Using the current Microsoft Internet Explorer® web browser, each web page returned by a web server occupies the entire web page viewing area of the web browser window object. When a user selects a new web page by clicking on a link within the web page viewing area, the new web page replaces the original web page. The only way of using the current version of Microsoft Internet Explorer® to simultaneously view two or more web pages is to open another instance of the browser.

In light of this shortcoming of conventional web browsers, web browsers that allow users to simultaneously display multiple web pages using tabs have been developed. For example, the Firefox® web browser available from Mozilla Corporation allows the simultaneously display of multiple web pages using tabs. The ability to create and navigate web page tabs is referred to as tabbed browsing and allows a user to quickly switch between previously accessed web pages. Tabs are arranged in a horizontal array in order of creation in the web page viewing area. In order to select a tab and view the corresponding web page, the user clicks on the tab. The selected tab blocks the view of content in the remaining tabs.

One problem associated with tab-based web browsers and other tab-based interfaces is that these interfaces do not provide mechanisms for reordering or grouping tabs. For example, the above-described Mozilla Firefox® browser displays tabs in order of creation and does not allow tabs to be re-ordered or grouped. Downloadable extensions to tab-based browsers allow users to select the location of newly opened tabs. However, such extensions do not automatically group tabs in a manner that utilizes content relationships and user interaction levels.

Accordingly, in light of these difficulties, there exists a need for methods, systems, and computer program products for grouping tabbed portions of a display object based on content relationships and user interaction levels.

SUMMARY

The subject matter described herein includes methods, systems, and computer program products for grouping tabbed portions of a display object based on content relationships and user interaction levels. According to one method, a display object with one or more tabbed portions is provided. A level of user interaction associated with each of the tabbed portions is monitored. Input is received from the user for adding new information to a display object. A level of content relationship between the new information and information associated with at least one of the tabbed portions is determined. A new tabbed portion that contains the new information is created. The new tabbed portion is grouped with the at least one tabbed portion based on the level of user interaction associated with the at least one tabbed portion and the level of content relationship between the new information and the information associated with at least one tabbed portion.

Certain actions are described herein as occurring in response to other actions. The phrase "in response to" is not intended to be limited to any particular temporal relationship. For example, a second action that occurs in response to a first action may occur immediately after the first action or at some time later than the first action. In addition, intervening actions or events may occur between the first and second actions.

The subject matter described herein for grouping tabbed portions of a display object may be implemented using a computer program product comprising computer executable instructions embodied in a computer readable medium. Exemplary computer readable media suitable for implementing the subject matter described herein include disk memory devices, chip memory devices, programmable logic devices, application specific integrated circuits and the like. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
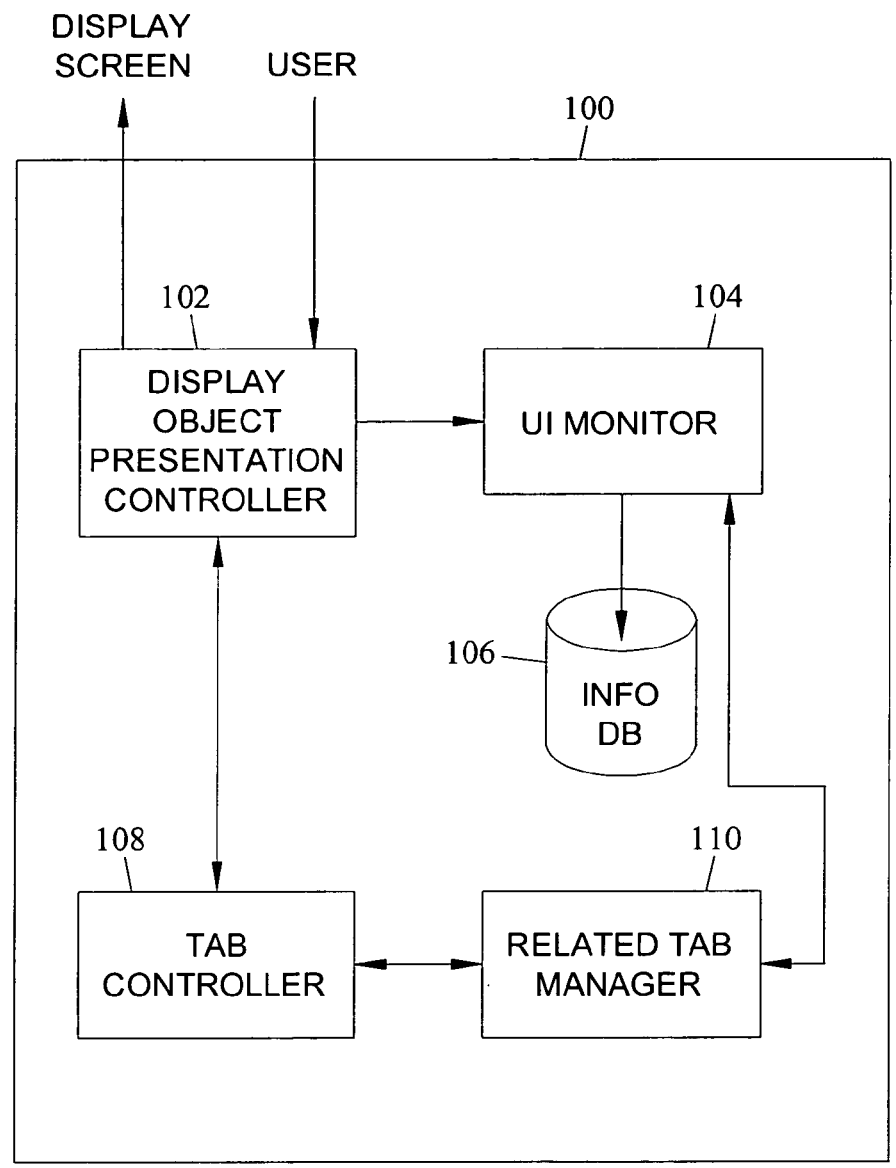
FIG. 1 is a block diagram of a system for grouping tabbed portions of a display object based on content relationships and user interaction levels according to an embodiment of the subject matter described herein.

The subject matter described herein includes methods, systems, and computer program products for grouping tabbed portions of a display object based on content relationships and user interaction levels. FIG. 1 is a block diagram illustrating an exemplary system for grouping tabbed portions of a display object based on content relationships and user interaction levels according to an embodiment of the subject matter described herein. Referring to FIG. 1, system 100 may include a display object presentation controller 102, a user interaction monitor 104 and associated database 106, a tab controller 108, and a related tab manager 110. Display object presentation controller 102 may control or provide for display of objects to a user via a computer display device. For example, display object presentation controller 102 may be a window presentation controller that displays window objects including one or more folder tabs to a user. In one example, display object presentation controller 102 may provide a window object usable by a web browser for displaying web pages as folder tabs. Display object presentation controller 102 may also receive input from a user for controlling display of tabbed portions of a display object. For example, display object presentation controller 102 may receive user input for creating or displaying new foldertabs. Display object presentation controller 102 may communicate information regarding user interaction with existing tabs to user interaction monitor 104. Display object presentation controller 102 may communicate user requests to create new tabs to tab controller 108.

User interaction monitor 104 may monitor a level of user interaction associated with tabbed portions of a display object. For example, user interaction monitor 104 may monitor at least one of a recency of user interaction with a tabbed portion of a display object and an amount of time associated with each user interaction. User interaction monitor 104 may begin measuring time associated with a user interaction in response to detecting that a tabbed portion of a display object has focus. Such focus may be detected, for example, when a user clicks on or moves a curser over a tabbed portion of a display object to select the portion or object. When an object or component of a graphical user interface (GUI) is said to have "focus," it will be understood that the component is currently selected, such that input from the GUI, including text entered at a keyboard or pasted from a clipboard, is sent to the component currently having focus. In an alternate example, user interaction monitor 104 may determine a level of user interaction associated with a tabbed portion of a display object based on an amount of user input associated with the tabbed portion. For example, user interaction monitor 104 may monitor a number of keystrokes or other input entered by a user when a tabbed portion of a display object has focus. Information regarding user interaction associated with a display object may be stored in user interaction database 106.

In one implementation, user interaction monitor 104 may assign a recency rank and a percentage utilization rank to each tabbed portion of a display object. User interaction monitor 104 may monitor user interactions with all or a predetermined subset of tabbed portions for time periods between events that indicate a new instance of an application associated with a tabbed portion. A new instance of an application may be indicated when a new browser or other application window is started. User interactions may be separately monitored for tabs within each window object so that groupings of tabbed portions can be made within each window object. In an alternate embodiment, device status can be used to reset the user interaction monitoring. For example, the system may track user interactions with each tabbed portion after every restart, power on, start, or other event. The user interaction timer may be reset when such events occur.

As stated above, interaction of a user with each tab may be determined based on focus. In current computer operating systems, several window objects, each having associated tabs, may be presented on a display screen at a given time. The window having focus may be the window where the cursor resides. Selection of a window or tab does not imply continuous interaction of the user with the tab, but it provides a good estimate of the prominence or focus of the window with respect to other windows. Accordingly, as stated above, focus on a window or tab may be used to start timing user interaction with the associated window or tab.

As stated above, in an alternate example, the interaction level associated with the tab may be measured by an amount of user input, such as the number of keystrokes that were entered within each tab. Measuring an amount of user input is advantageous in that this metric uses a deeper interaction metric than selection. However, using the number of keystrokes as a measure of a user interaction level may fail to indicate the relative utilization of a tab when a user spends a lot of time reading information in a tab. This is especially true for web pages where the user spends more time reading, and there is almost no input from the user in the window except scrolling. In such instances, the amount of scrolling or, the number of repeat visits to a page, or time-based metrics may be used to measure user interaction.

Tab controller 108 may receive user input to add information to a display object, create a new tabbed portion containing the new information, and group the new tabbed portion with one or more existing tabbed portions of the display object based on the level of user interaction associated with the one or more tabbed portions and the level of content relationship between the new information and information associated with the existing tabbed portion or portions. In one implementation, tab controller 108 may receive input via display object presentation controller 102 that indicates that a user wishes to add a new tabbed portion to a display object. Tab controller 108 may then obtain information from related tab manager 110 indicating the level of content relationship between the new information and one or more existing tabbed portions associated with a display object. Tab controller 108 may also obtain information from user interaction monitor 104 that indicates the level of user interaction associated with the existing tabbed portions. Based on this information, tab controller 108 may group the new tabbed portion with one or more existing tabbed portions.

In one implementation, tab controller 108 may identify the existing tabbed portion associated with a window object having a highest level of content relationship with the new information. Tab controller 108 may group the existing tabbed portion with the new tabbed portion in response to the existing tabbed portion having a level of user interaction that exceeds a threshold. However, if the level of user interaction associated with the existing tabbed portion does not exceed the threshold, tab controller 108 may select a tabbed portion with the next highest level of content relationship with the new information and may repeat the test for determining whether the user interaction with the selected tabbed portion exceeds the threshold. The process may be repeated for multiple tabbed portions to identify the highest-utilized existing tabbed portions with which the new tabbed portions could be grouped.

In one implementation, if tab controller 108 identifies an existing tabbed portion that has a high level of content relationship with the new tabbed portion and a high level of user interaction, tab controller 108 may associate the new tabbed portion with the existing tabbed portion as a child of the existing tabbed portion. This operation is particularly useful when the existing tabbed portion has focus at the time the new tabbed portion is being added to the browser window. If tab controller 108 determines that the existing tabbed portion has a high level of content relationship with the new tabbed portion and a low level of user interaction, tab controller 108 may associate the new tabbed portion with the existing tabbed portion as a parent of the existing tabbed portion. Thus, if a user has temporarily lost interest in the information presented in a tabbed portion over the course of a browsing session, but later in the session requests information be displayed in the new tabbed portion that is related to the previously viewed information, the "dormant" tab can be automatically grouped with the new tabbed portion as child window. This can save the user the trouble of having to locate the information included in the "dormant" tab, especially when a large number of tabbed portions have be added to the browser over the course of the browsing session.

Tab controller 108 may receive, from display object presentation controller 102, a request for a new tabbed portion to be displayed in a window object. If the item being displayed is a web page, the additional information to be displayed may be a folder tab corresponding to the web page. Requests for displaying web pages may be received when a user clicks on a web link in a web browser, enters web page location information in the location bar field of a web browser, clicks on a URL in an open tab, or clicks on a URL in an email. In other examples, tab controller 108 may receive an entering of information associated with an element of a display object to which a tab is requested to be added. Examples of information that may be entered in elements associated with a display object may include information entered into a search query box, information entered into a browser location bar, activation of a link in a favorites menu of a browser, or activation of a link stored in a history list of a browser.

In another example, tab controller 108 may receive a request for adding information to a display object from executable code associated with the display object, such as Java® script associated with a web browser. In yet another example, tab controller 108 may receive the request for adding information to a display object from an application program that is not directly associated with the display object. For example, tab controller 108 may receive a request for adding information to a display object from user activation of a link in an application, such as a word processing application, that launches a browser or a tab externally to the browser or tab.

When a request for adding information to a display object is received, tab controller 108 may extract parameter values from fields associated with the web page for generating the new folder tab. Tab controller 108 may also pass this information to related tab manager 110. The following illustrates a non-exhaustive list of examples of information that may be extracted by tab controller 108 when the information requested to be displayed is a web page:
The title of the page:
 e.g., <title>North Carolina State University</title>
The meta name of the page:
 e.g., <meta name="Title" content="CNN.com—Breaking News, U.S., World, Weather, Entertainment & Video News">
The links contained within the page:
 e.g., <a href=http://mobile.wral.com/online/>

Related tab manager 110 may receive the information from tab controller 108 and may identify a level of content relationship between the new information and information associated with one or more existing tabs. For example, related tab manager 110 may identify tabbed portions associated with a display object that are related to a new tabbed portion by comparing a portion of new information that is to be or that is associated with an element of the new tabbed portion and information associated with an element of the existing tabbed portion. Related tab manager 110 may assign a score to the content relationship between the new information and the information included in the tabbed portion based on results of the comparison. In one implementation, related tab manager 110 may compare information associated with elements, such as a title bar, a tab bar, a location bar, a search bar, a toolbar, a status bar, a browser pane, a history pane, a favorites pane, a link associated with at least one of a browser, a history, and a favorites pane, metadata, a header portion, a footer portion, information included in a list item, and a control associated with tabbed portions to identify levels of content relationship between the tabbed portions. Related elements may be compared. For example, it may be desirable to compare information associated with corresponding elements, such as comparing titles associated with tabbed portions. In an alternate implementation, it may be desirable to compare elements that do not correspond to each other. For example, it may be desirable to compare a title of one tabbed portion to a link associated with another tabbed portion.

As stated above, when tab controller 108 receives a request for adding information to a display object, tab controller 108 may pass information relating to the request to related tab manager 110. Related tab manager 110 may perform the task of finding one or more related tabs associated with the display object currently open based on information corresponding to each tabbed portion.

Related tab manager 110 may perform the task of finding a related tab from the tabbed portions of the window object that are currently open based on the information corresponding to each tabbed portion. In one implementation, related tab manager 110 compares the contents of the additional information with the content that it receives for each tabbed portion of the window object. The comparison may be performed in the following way:
 i. If the title of the additional information and the title of the tabbed portion contain any term that is the same, the tabbed portion's score is increased by +2 for each match. If no terms between the two are the same no action is taken.

ii. The metadata tags of the additional information are compared to the metadata tags for each of the tabbed portions. For every metadata term that matches, the tabbed portion gets a score of +1. Thus, if two of the metadata terms in the additional information match the metadata tags of a tabbed portion, then the tabbed portion will get a score of +2. Several tabbed portions may have metadata terms that match. Each such tabbed portion will have a score based on the number of matching terms.

iii. The URL of the additional information is compared with the URLs contained in the tabbed portions of the window object. If the URL of the additional information is contained in the tabbed portions, the score for those tabbed portions is augmented by +3.

iv. For each tabbed portion, a calculation is made for the content score by adding the scores obtained from steps i, ii, and iii.

v. The tabbed portion with the highest content score is taken. The information about the interaction level of all tabbed portions stored in information database 106 is retrieved. Database 106 stores the recency rank and the percentage of time spent on the tabbed portion.

A first test that is performed on the tabbed portion with the highest content score is to check if it has been recently browsed. There are several possible implementations to make this determination. In one exemplary implementation, tab controller 108 may check to see if the tabbed portion is in the top 50% of all tabbed portions. In alternative embodiments, additional temporal aspects may be included in the measurement. For example, the system could consider a tabbed portion to be recently browsed if it was interacted within the last hour.

A second test that is performed on the tabbed portion is determining whether the percentage of time spent interacting with the tabbed portion exceeds a threshold. There are several possible implementations for calculating that the time spent on a tabbed portion is enough to relate it to the additional information. In one implementation, tabs that fall within the top 50% in terms of the time spent are considered recent enough. A goal is to eliminate rarely used tabbed portions. The top 50% of the tabs are ordered from highest to lowest.

If the tabbed portion with the highest content score passes both the tests pertaining to the user interaction level, then the tabbed portion is identified as the tabbed portion related to the additional information. If not, the tabbed portion with the next highest content ranking is considered and same tests are applied. The result is a related tabbed portion. It is possible that none of the tabs meet the criteria of being related. In that case the method returns no related tab.

As stated above, related tab manager 110 may provide information indicating the level of content relationship between information associated with requested and existing tab portions. Tab controller 108 may use the relationship information in combination with user interaction information to determine how to group and display the tabbed portions.

Figure 2:
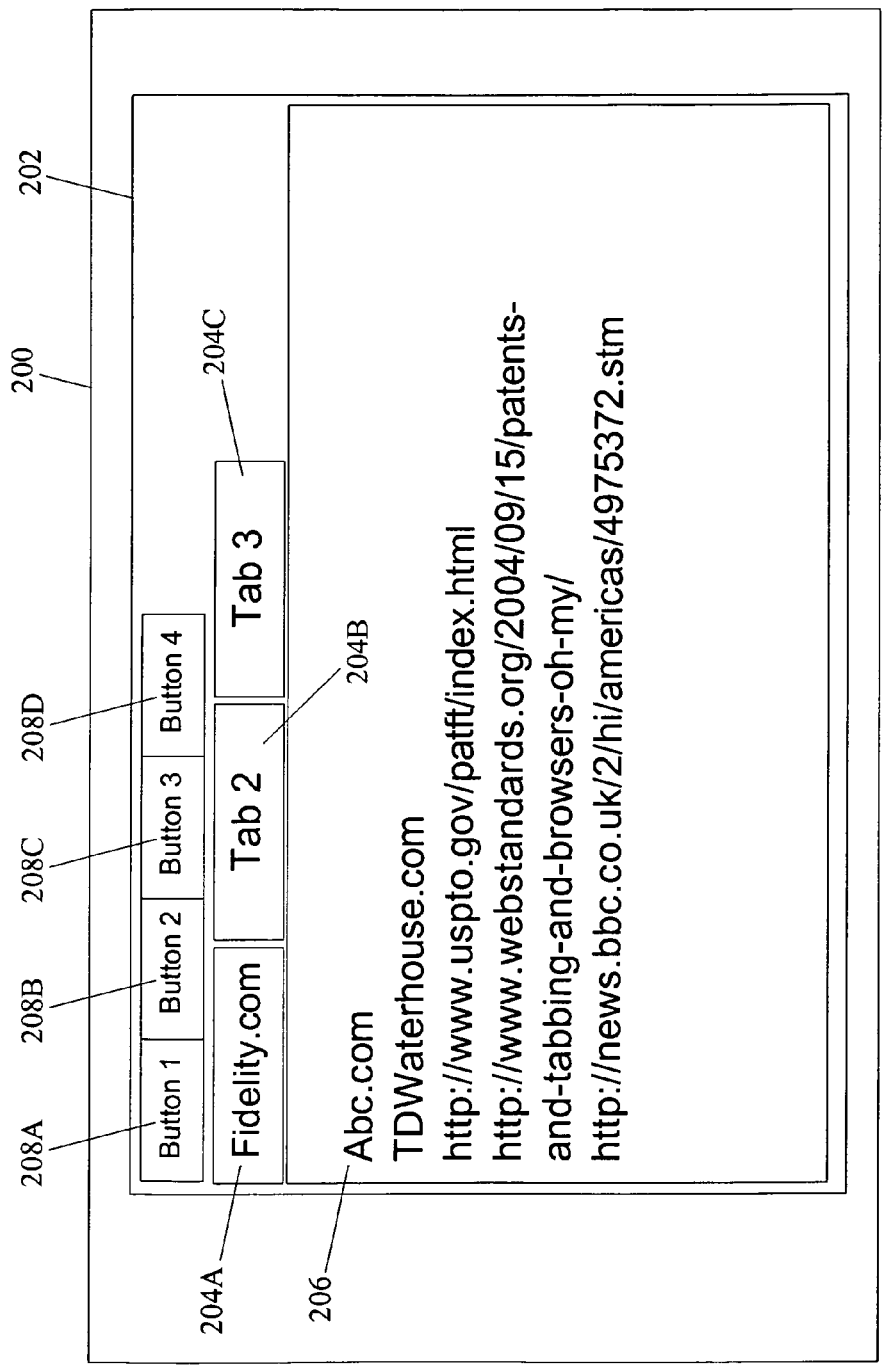
FIG. 2 is a block diagram illustrating an exemplary window object with tabbed portions according to an embodiment of the subject matter described herein.

FIG. 2 is a block diagram illustrating a display screen, a window object, and tabbed portions associated with a web browser. In FIG. 2, display screen 200 may be any suitable display screen, such as a display screen associated with a personal computer, a mobile telephone, a smart phone, a personal digital assistant, or any other device capable of displaying information to a user in graphical format. A window object 202 may be a graphical entity for displaying information. For example, window object 202 may be a window object that is associated with a web browser. Tabbed portions 204A-204C may each include content to be displayed to the user. In the illustrated example, tab 204B is the selected tab (e.g., the tab having focus) and includes web links 206 to be displayed to the user. The data in remaining tabs 204A and 204C is blocked by tab 204B. Buttons 208A-208D may control various actions of the application corresponding to window object 202. For example, if the application is a web browser, buttons 208A-208D may activate web browser functions.

Figure 3:
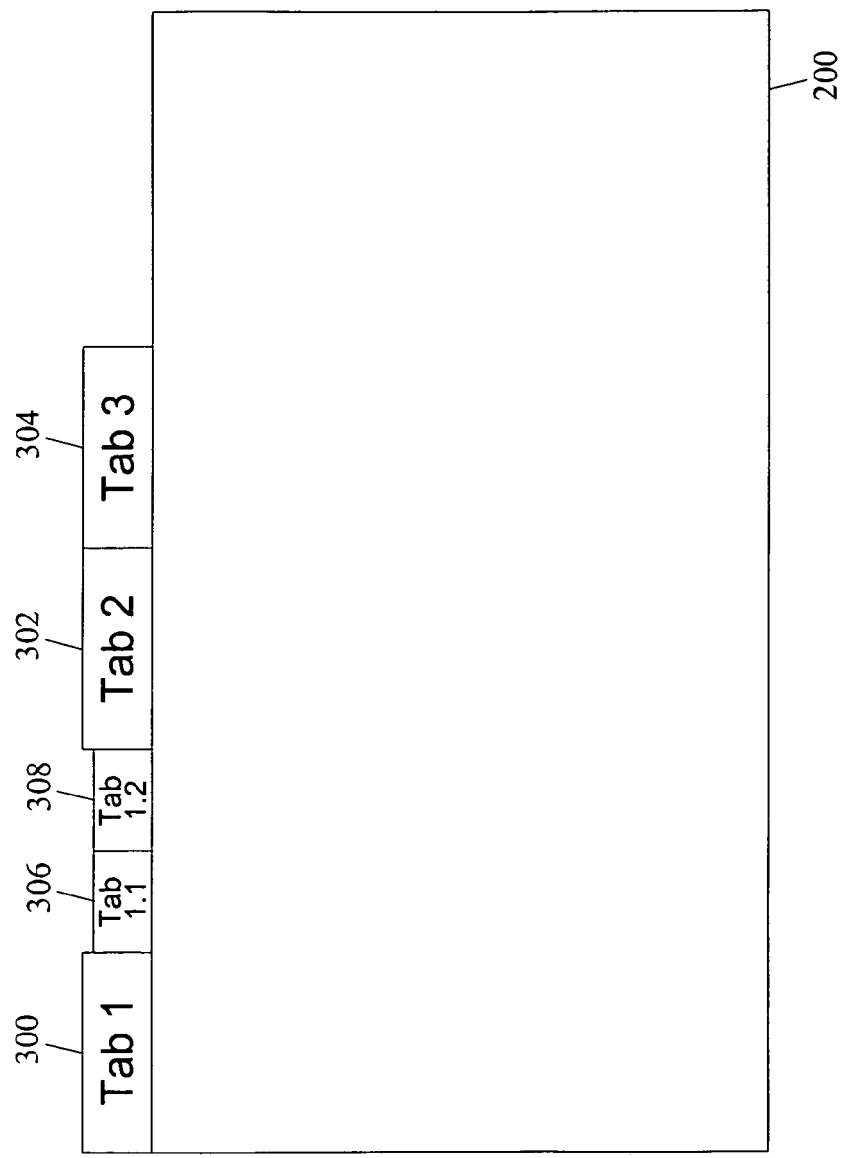
FIG. 3 is a block diagram illustrating an exemplary method for displaying tabbed portions of a display object in a manner that illustrates groupings between tabs according to an embodiment of the subject matter described herein.

In FIG. 2, it can be seen that browser tabs are displayed in an equal manner. That is, other than the selected tab being displayed in front of the other tabs, no groupings are present. The subject matter described herein may be used to group tabs based on relationships between tabs and to display such relationships to the user. FIG. 3 is a block diagram illustrating one method that may be used to display tabs in a manner that illustrates a grouping relationship between the tabs. Referring to FIG. 3, display object 200 may be any suitable display object, such as a window object. Tabs 300, 302, and 304 are shown with tab identifier portions of equal size. However, tabs 306 and 308 are shown as being adjacent to tab 300 and are shown with smaller tab identifier portions than tab 300. The adjacency and the size relationships between tabs 300, 306, and 308 are intended to illustrate a parent-child relationship between tab 300 and tabs 306 and 308. That is, tabs 306 and 308 are shown as children of tab 300.

Figure 4:
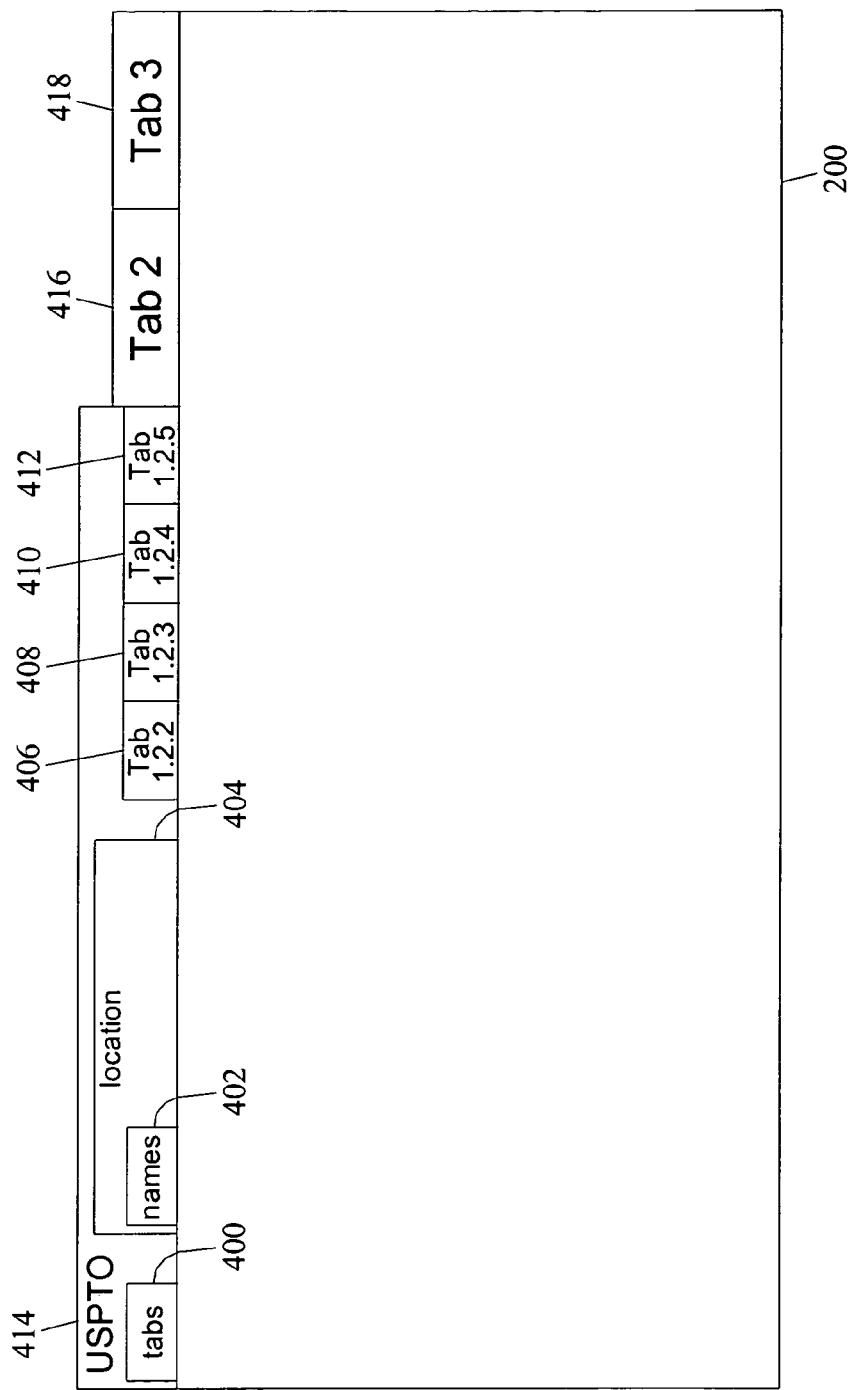
FIG. 4 is a block diagram illustrating an alternate method for displaying tabbed portions of a display objects in a manner that illustrates groupings between tabs according to an embodiment of the subject matter described herein.

FIG. 4 is a block diagram illustrating another example of a method for displaying tabs in a manner that illustrates groupings between the tabs according to an embodiment of the subject matter described herein. Referring to FIG. 4, tabs 400, 402, 404, 406, 408, 410, and 412 are shown with their corresponding tab identifier portions being within a tab identifier portion of tab 414. In this arrangement, tabs 400, 402, 404, 406, 408, 410, and 412 are intended to be depicted as children of tab 414. Tabs 416 and 418 represent different groups that are not part of the parent-child relationship. It should also be noted that in the example in FIG. 4, multiple levels of relationships can be shown. For example, tab 402 is shown as a child of tab 404, and child 404 is shown as a child of tab 414, making tab 402 a grandchild of tab 414.

Figure 5:
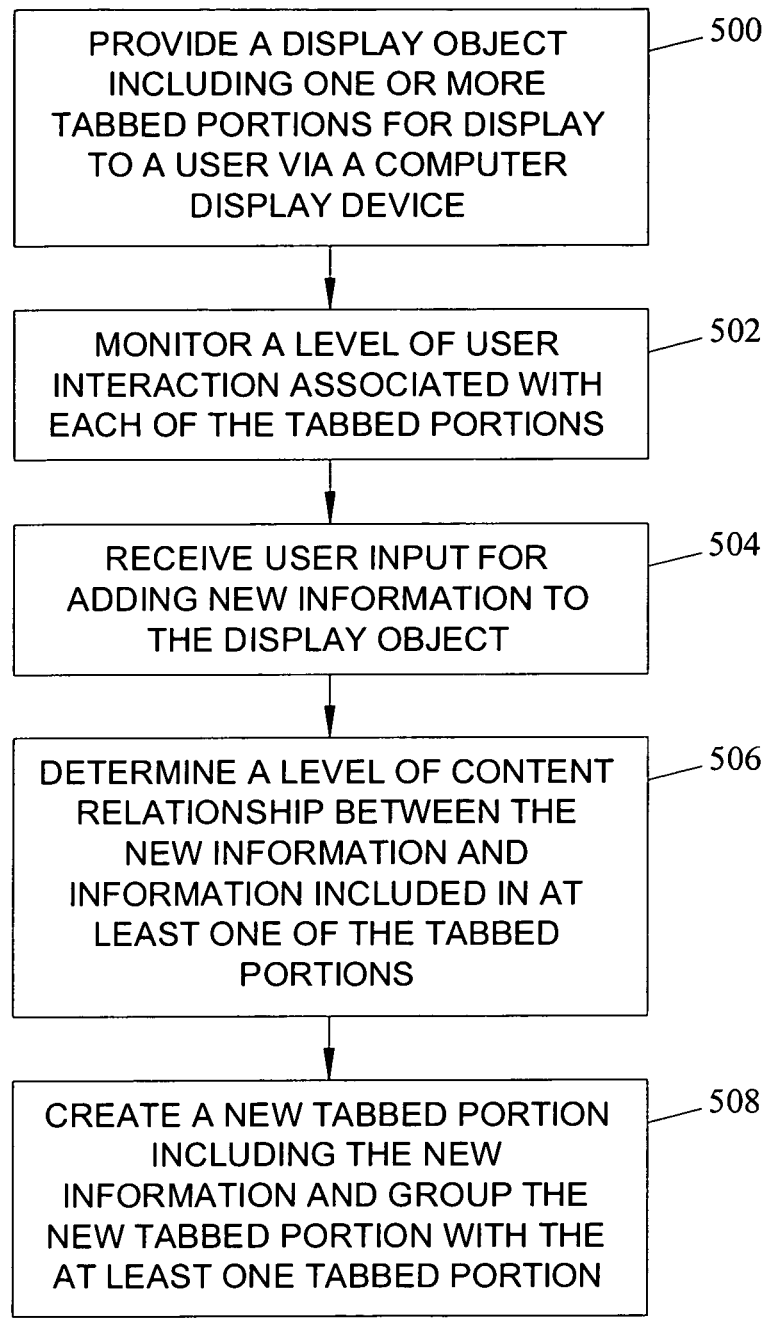
FIG. 5 is a flow chart illustrating an exemplary process for grouping tabbed portions of a display object based on content relationships and user interaction levels according to an embodiment of the subject matter described herein.

FIG. 5 is a flow chart illustrating an exemplary process for grouping tabbed portions of a display based on content relationships and user interaction that is according to an embodiment of the subject matter described herein. Referring to FIG. 5, in block 500, a display object including one or more tabbed portions is provided for display to a user via a computer display device. For example, display object presentation controller 102 may display a window object including one or more folder tabs. In block 502, a level of user interaction associated with each of the tabbed portions is monitored. The user interaction level may be monitored by user interaction monitor 104 using any of the metrics described herein. In block 504, user input for adding new information to the display object is received. For example, display object presentation controller 102 may receive a request to add information to a display object and may provide the request to tab controller 108.

In block 506, a level of content relationship between the new information and information included in at least one of the existing tab portions is determined. For example, related tab manager 110 may compare the new information with information associated with other requested or existing tabs and determine a level of content relationship associated with each set of information being compared. In block 508, a new tabbed portion including the new information is created and grouped with at least one of the existing tabbed portions based on the determined level of content relationship and the level of user interaction associated with the existing tabbed portion. For example, tab controller 108 may use the information collected by related tab manager 110 and user interaction monitor 104 to identify other new or existing tabs related to the tab being added, to determine user interaction levels associated with the other new or existing tabs, and to group the new tab with one or more of the other new or existing tabs.

Figure 6:
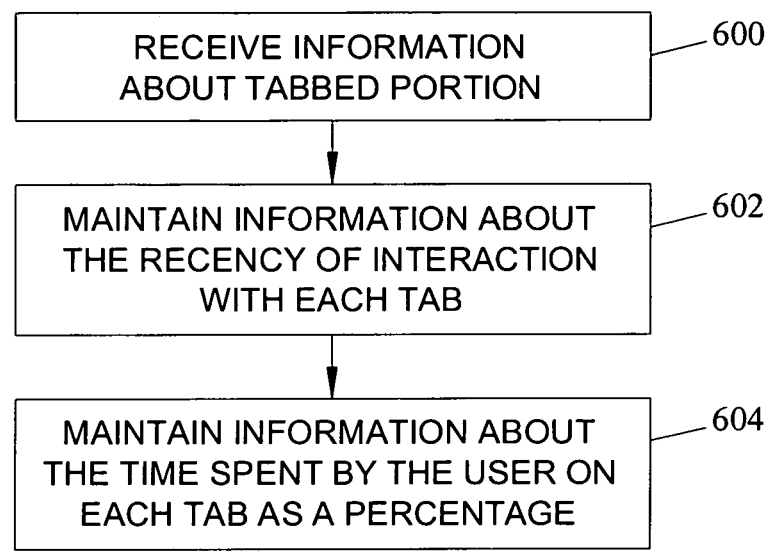
FIG. 6 is a flow chart illustrating an exemplary process for monitoring user interaction associated with tabbed portions of a display object according to an embodiment of the subject matter described herein.

FIG. 6 is a flow chart illustrating an exemplary process for monitoring tabs. Referring to FIG. 6, in block 600, information about a tabbed portion is received. For example, user interaction monitor 104 may receive identifying information for a tab from tab controller 108 or from display object presentation controller 102. In block 602, information about the recency of interaction with each tab is maintained. Information about recency may include determining when each tab last had focus, as described above. In block 604, information about the time spent by the user interacting with each tab as a percentage of total time spent on the remaining tabs is recorded. The time spent interacting with each tab may be measured by the time during which the tab has focus, as described above. Alternatively, user interaction may be measured by an amount of user input associated with each tab.

Figure 7:
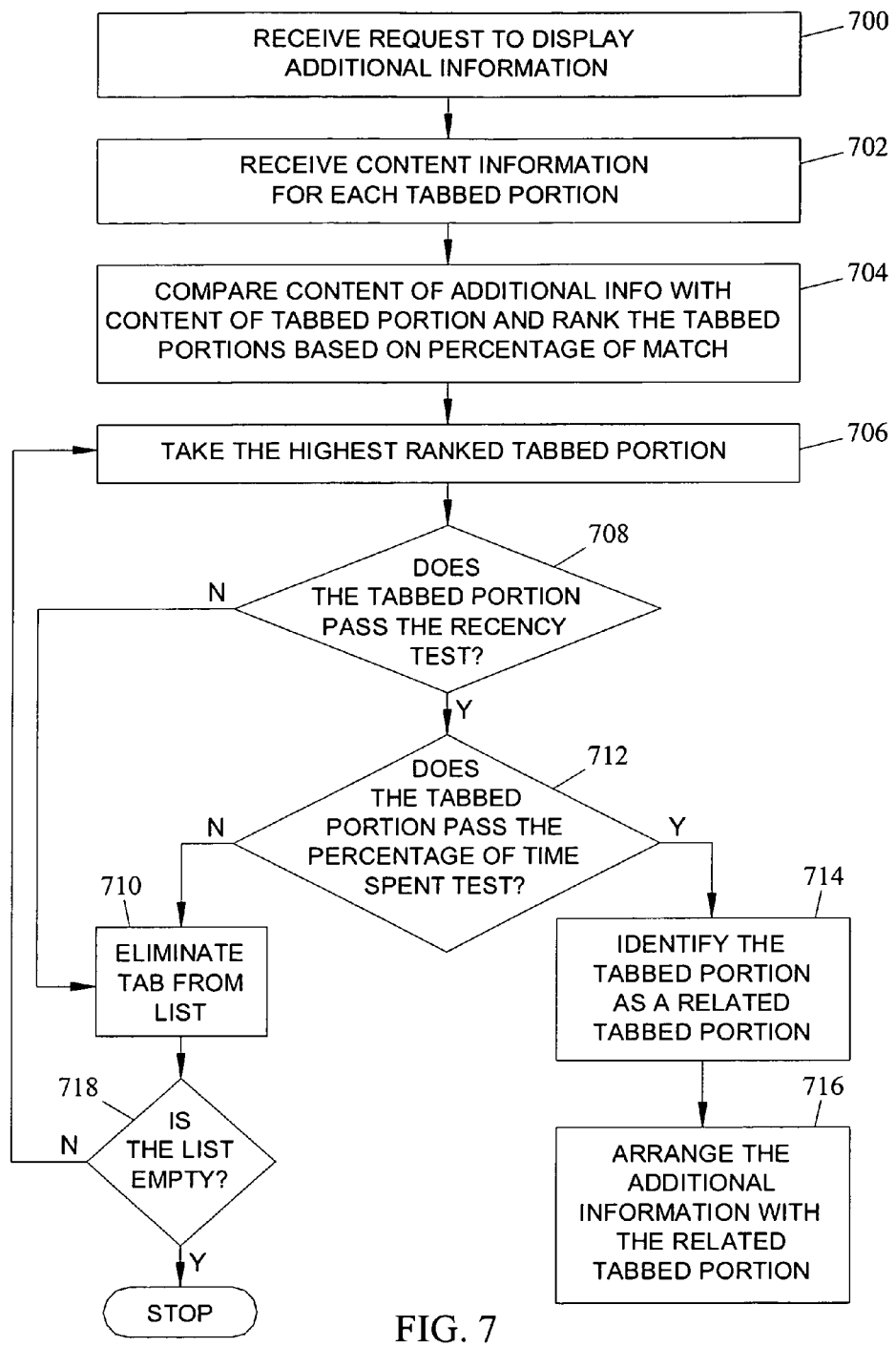
FIG. 7 is a flow chart illustrating an exemplary process for identifying a level of content relationship between tabs and information according to an embodiment of the subject matter described herein.

FIG. 7 is a flow chart illustrating an exemplary process for identifying related tabs. Referring to FIG. 7, in block 700, a request to display information is received. For example, the request may be a request to add a web page tab to the viewing area of a web browser. In block 702, content information for each tabbed portion is received. For example, the content information from an existing tab portion may be extracted from information database 106 illustrated in FIG. 1. The content information for the new tabbed portion may be extracted from the request from the user.

In block 704, content of the new or additional information is compared with content of the existing tabbed portions. The tabbed portions may be ranked based on percentage of match with the new information. In block 706, a highest ranked tabbed portion based on match is selected. In block 708, it is determined whether the tabbed portion passes the recency test. As stated above, the recency test may include comparing the time that the user last interacted with a tab with a predetermined threshold. If the tab has not been interacted with within a predetermined time period, it may be excluded from consideration for grouping with the new information. Accordingly, in block 708, if the tabbed portion does not pass the recency test, control proceeds to block 710 where the tab is eliminated from the list. If the tab passes the recency test, control proceeds to block 712 where it is determined whether the tabbed portion passes the percentage of time spent test. As stated above, the percentage of time spent test may include comparing the percentage of time spent in the tab with a threshold. If the tab does not pass this test, control may proceed to block 710 where the tab is eliminated from potential grouping with the new information. If the tab passes, control proceeds to block 714 where the tabbed portion is identified as a related tabbed portion. Control may then proceed to block 716 where the additional information is arranged or grouped with the related tabbed portion.

Returning to block 710, if the tab is eliminated from the list, control proceeds to block 718 where it is determined whether the list is empty. If the list is empty, the process of identifying related tabs ends. If the list is not empty, control returns to block 706 where the next highest ranked tabbed portion in the list is tested.

According to one aspect of the subject matter described herein, a system for grouping tabbed portions of a display object based on content relationships and user interaction levels associated with the tabbed portions is provided. The system may include means for providing a display object including one or more tabbed portions for display to a user via a computer display device. For example, display object presentation controller 102 may display one or more window objects having tabbed portions via a computer display device. The system may further include means for monitoring a level of user interaction associated with each of the tabbed portions. For example, user interaction monitor 104 may monitor a level of user interaction associated with tabbed portions of a display object using any of the user interaction metrics described above.

The system may further include means for receiving user input for adding information to the display object. For example, display object presentation controller 102 may receive user input for adding a new folder tab to a web browser presentation area and may pass the input to tab controller 108. The system may further include means for determining a level of content relationship between the new information and information included in at least one of the tabbed portions. For example, related tab manager 110 may compare information extracted from the user input with information stored for existing tabbed portions to identify a level of content relationship between the new information and the existing tabbed portions.

The system may further include means for creating a new tabbed portion including the new information and grouping the new tabbed portion with the at least one tabbed portion based on the determined level of content relationship and the level of user interaction associated with the at least one tabbed portion. For example, tab controller 108 may create a new folder tab containing information extracted from the user input requesting the new tabbed portion. Tab controller 108 may group the new folder tab with one or more existing folder tabs based on the level of content relationship between the new information and the existing folder tabs and the user interaction levels associated with the existing folder tabs.

It will be understood that various details of the invention may be changed without departing from the scope of the invention. Furthermore, the foregoing description is for the purpose of illustration only, and not for the purpose of limitation.

What is claimed is:

1. A method for grouping tabbed portions of a display object based on content relationships and user interaction levels, the method comprising:
   providing a display object including one or more tabbed portions for display to a user via a computer display device;
   monitoring a level of user interaction associated with each of the tabbed portions;
   receiving user input for adding new information to the display object;
   determining, without user input, a level of content relationship between the new information and information included in at least one of the tabbed portions; and
   creating a new tabbed portion including the new information and grouping the new tabbed portion with the at least one tabbed portion based on the determined level of content relationship and the level of user interaction associated with the at least one tabbed portion.

2. The method of claim 1 wherein providing a display object including one or more tabbed portions includes providing a window object including one or more folder tabs.

3. The method of claim 1 wherein providing a display object including one or more tabbed portions includes providing a window object controllable by a web browser to control display of one or more web pages as one or more folder tabs.

4. The method of claim 1 wherein monitoring a level of user interaction associated with each of the tabbed portions includes, for each tabbed portion, monitoring at least one of a recency of user interaction associated with the tabbed portion and an amount of time associated with the user interaction.

5. The method of claim 1 wherein monitoring a level of user interaction associated with each tabbed portion includes, for each tabbed portion, detecting when the tabbed portion has focus and monitoring a time during which the tabbed portion maintains focus.

6. The method of claim 1 wherein monitoring a level of user interaction associated with each of the tabbed portions includes, for each tabbed portion, monitoring an amount of user input associated with the tabbed portion.

7. The method of claim 1 wherein receiving user input for adding information to the display object includes receiving user input for adding a web page as a tabbed portion to the display object.

8. The method of claim 1 wherein receiving user input for adding information to the display object includes detecting at least one of:
 an activation of a link displayed in a tabbed portion;
 an entering of information associated with an element of the display object;
 a request for adding the information from executable code associated with the display object; and
 a request for adding the information from an application program not directly associated with the display object.

9. The method of claim 1 wherein determining a level of content relationship between the new information and information included in at least one of the tabbed portions includes comparing a portion of the new information to be or being associated with an element of the new tabbed portion and information associated with an element of the at least one tabbed portion and assigning a score to the content relationship between the new information and the information included in the at least one tabbed portion based on results of the comparison.

10. The method of claim 9 wherein the elements of the tabbed portions include at least one of a title bar, a tab bar, a location bar, a search bar, a tool bar, a status bar, a browser pane, a history pane, a favorites pane, a link associated with at least one of the browser, history, and favorites pane, metadata, a header portion, a footer portion, information included in a list item, and a control.

11. The method of claim 10 wherein the portions of information compared are associated with corresponding elements of the new and the at least one tabbed portion to be grouped.

12. The method of claim 1 wherein grouping the new tabbed portion with the at least one tabbed portion includes identifying a first tabbed portion from the plurality of tabbed portions having a highest level of content relationship among the plurality of tabbed portions with the new information, determining whether the first tabbed portion has a level of user interaction that exceeds a threshold, and, in response to determining that the level of user interaction associated with the first tabbed portion exceeds the threshold, grouping the new tabbed portion with the first tabbed portion.

13. The method of claim 12 wherein grouping the new tabbed portion with the at least one tabbed portion includes, in response to determining that the first tabbed portion does not have a level of user interaction that exceeds the threshold, refraining from grouping the new tabbed portion with the first tabbed portion and selecting a second tabbed portion having a second highest level of content relationship with the new information as a candidate for grouping with the new tabbed portion.

14. The method of claim 1 wherein grouping the new tabbed portion with the at least one tabbed portion includes associating the new tabbed portion with the at least one tabbed portion as a parent of the at least one tabbed portion in response to the at least one tabbed portion having a first level of user interaction and a first level of content relationship with the new information.

15. The method of claim 14 wherein grouping the new tabbed portion with the at least one tabbed portion includes associating the new tabbed portion with the at least one tabbed portion as a child of the at least one tabbed portion in response to the at least one tabbed portion having a second level of user interaction higher than the first level of user interaction and at least the first level of content relationship with the new information.

16. The method of claim 1 comprising displaying the new tabbed portion with the at least one tabbed portion in a manner that illustrates the grouping between the new tabbed portion and the at least one tabbed portion.

17. The method of claim 16 wherein displaying the new tabbed portion with the at least one tabbed portion in a manner that illustrates the grouping includes displaying the new tabbed portion and the at least one tabbed portion in a manner that illustrates a parent-child relationship between the new tabbed portion and the at least one tabbed portion.

18. A system for grouping tabbed portions of a display object based on content relationships and user interaction levels associated with the tabbed portions, the system comprising:
 a display object presentation controller for providing a display object including one or more tabbed portions for display to a user via a computer display device;
 a user interaction monitor for monitoring a level of user interaction associated with each of the tabbed portions;
 a tab controller for receiving user input for adding information to the display object;
 a related tab manager for determining, without user input, a level of content relationship between the new information and information included in at least one of the tabbed portions; and
 wherein the tab controller is adapted to create a new tabbed portion including the new information and to group the new tabbed portion with the at least one tabbed portion based on the level of user interaction associated with the at least one tabbed portion and the determined level of content relationship.

19. The system of claim 18 wherein the display object presentation controller comprises a window object presentation controller for displaying a window object including one or more folder tabs.

20. The system of claim 18 wherein the display object presentation controller is adapted to provide a window object usable by a web browser for displaying one or more web pages as one or more folder tabs.

21. The system of claim 18 wherein the user interaction monitor is adapted to determine the level of user interaction associated with each of the tabbed portions based on at least one of a recency of user interaction and an amount of time associated with each user interaction with each of the tabbed portions.

22. The system of claim 18 wherein the user interaction monitor is adapted to begin measuring time associated with a user interaction in response to one of the tabbed portions having focus.

23. The system of claim 18 wherein the user interaction monitor is adapted to determine the level of user interaction associated with each of the tabbed portions based on an amount of user input associated with each tabbed portion.

24. The system of claim 18 wherein the tab controller is adapted to receive user input for adding a new web page to the display object.

25. The system of claim 18 wherein the tab controller is adapted to detect at least one of:
   activation of a link displayed in a tabbed portion;
   an entering of information associated with an element of the display object;
   a request for adding the information from executable code associated with the display object; and
   a request for adding the information from an application program not directly associated with the display object.

26. The system of claim 18 wherein the related tab manager is adapted to identify a first tabbed portion that is related to the new tabbed portion by comparing a portion of the new information to be or being associated with an element of the new tabbed portion and information associated with an element of the at least one tabbed portion and assigning a score to the content relationship between the new information and the information included in the at least one tabbed portion based on results of the comparison.

27. The system of claim 26 wherein the elements of the tabbed portions include at least one of a title bar, a tab bar, a location bar, a search bar, a tool bar, a status bar, a browser pane, a history pane, a favorites pane, a link associated with at least one of the browser, history, and favorites pane, metadata, a header portion, a footer portion, information included in a list item, and a control.

28. The system of claim 27 wherein the portions of information compared are associated with corresponding elements of the new and the at least one tabbed portion to be grouped.

29. The system of claim 18 wherein the tab controller is adapted to identify a first tabbed portion including information having a highest level of content relationship with the new information and to group the first tabbed portion with the new tabbed portion in response to the first tabbed portion having a level of user interaction that exceeds a threshold.

30. The system of claim 29 wherein the tab controller is adapted to refrain from grouping the first tabbed portion with the new tabbed portion in response to the first tabbed portion having a level of user interaction that does not exceed the threshold and to identify a second tabbed portion of the plurality of tabbed portions with information having a second highest level of content relationship with the new information as a candidate for grouping with the new tabbed portion.

31. The system of claim 18 wherein the tab controller is adapted to associate the new tabbed portion with the at least one tabbed portion as a parent of the at least one tabbed portion in response to the at least one tabbed portion having a first level of content relationship with the new information and the at least one tabbed portion having a first level of user interaction.

32. The system of claim 31 wherein the tab controller is adapted to associate the new tabbed portion with the at least one tabbed portion as a child of the at least one tabbed portion in response to the at least one tabbed portion having the first level of content relationship with the new information and the at least one tabbed portion having a second level of user interaction higher than the first level of user interaction.

33. The system of claim 18 wherein the tab controller is adapted to display the new tabbed portion with the at least one tabbed portion in a manner that indicates the grouping between the new tabbed portion and the at least one tabbed portion.

34. A system for grouping tabbed portions of a display object based on content relationships and user interaction levels associated with the tabbed portions, the system comprising:
   means for providing a display object including one or more tabbed portions for display to a user via a computer display device;
   means for monitoring a level of user interaction associated with each of the tabbed portions;
   means for receiving user input for adding information to the display object;
   means for determining, without user input, a level of content relationship between the new information and information included in at least one of the tabbed portions; and
   means for creating a new tabbed portion including the new information and grouping the new tabbed portion with the at least one tabbed portion based on the determined level of content relationship and the level of user interaction associated with the at least one tabbed portion.

35. A computer program product comprising computer executable instructions embodied in a non-transitory computer readable medium for performing steps comprising:
   providing a display object including one or more tabbed portions for display to a user via a computer display device;
   monitoring a level of user interaction associated with each of the tabbed portions;
   receiving user input for adding information to the display object;
   determining, without user input, a level of content relationship between the new information and information included in at least one of the tabbed portions; and
   creating a new tabbed portion including the new information and grouping the new tabbed portion with the at least one tabbed portion based on the level of content relationship and the level of user interaction associated with the at least one tabbed portion.

\* \* \* \* \*